March 7, 1961 J. B. BRENNAN 2,974,041
METHOD OF PRODUCING ELECTRICALLY CONDUCTIVE
POROUS STRIP MATERIAL
Filed June 15, 1959
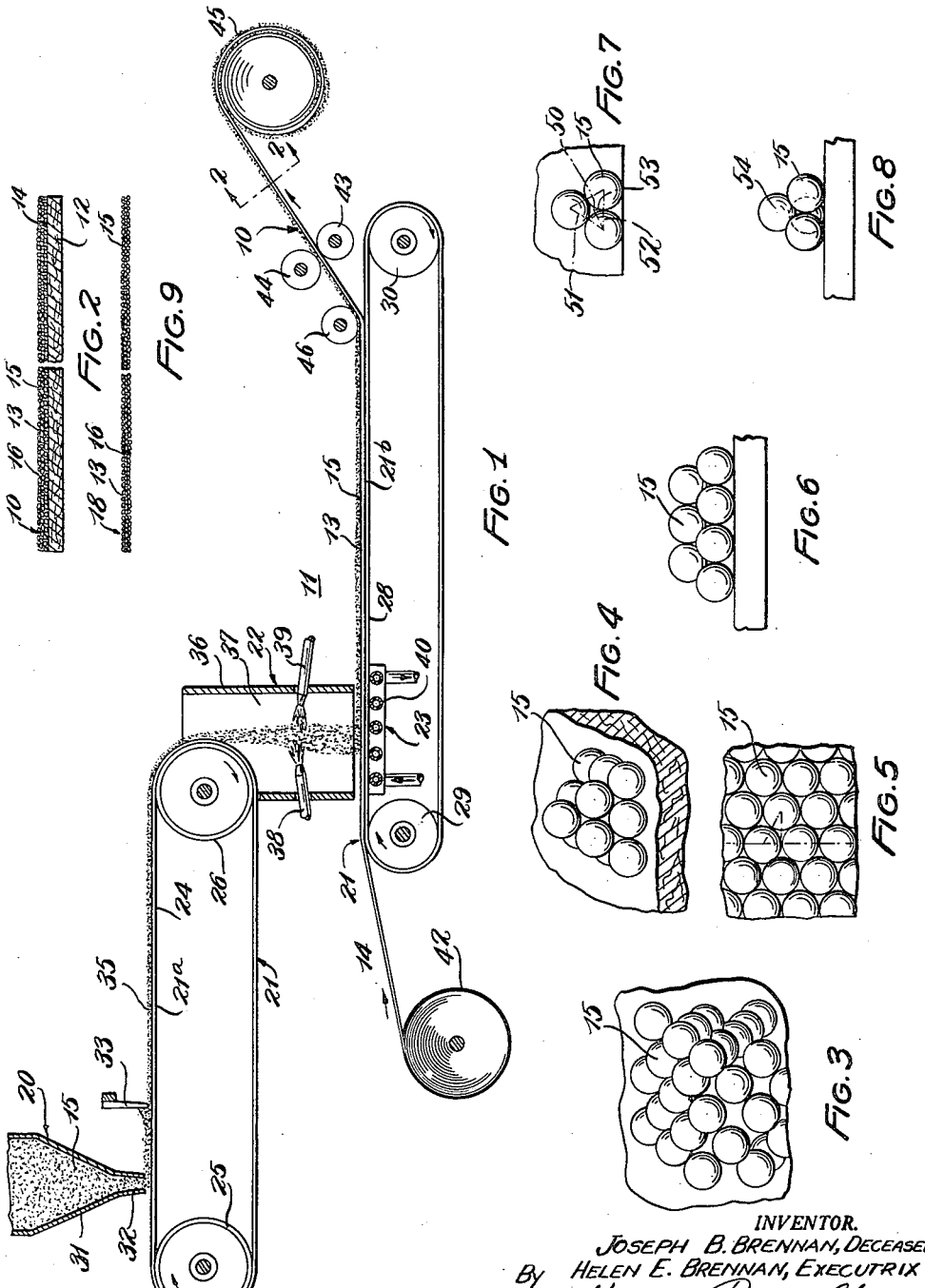
INVENTOR.
JOSEPH B. BRENNAN, DECEASED
By HELEN E. BRENNAN, EXECUTRIX
Hudson, Boughton,
Williams, David & Hoffman
ATTORNEYS United States Patent Office 2,974,041
Patented Mar. 7, 1961

2,974,041

METHOD OF PRODUCING ELECTRICALLY CONDUCTIVE POROUS STRIP MATERIAL

Joseph B. Brennan, deceased, late of Cleveland, Ohio, by Helen E. Brennan, executrix, 13018 Lake Shore Blvd., Cleveland 8, Ohio Filed June 15, 1959, Ser. No. 820,277

8 Claims. (Cl. 75—208)

This invention relates to the production of electrically conductive porous sheet or strip material by depositing metal particles and which material can be used for various purposes including use as a high capacity electrode of an electrical condenser.

As one of its objects, the invention provides a novel method for producing such electrically conductive porous sheet or strip material rapidly and economically by depositing metal particles on a moving support means. The method significantly employs the steps of dropping discrete metal particles by gravity, that is, as free-falling particles and heating the particles to a surface-plastic or exteriorly molten condition during their free-falling or gravity movement, and collecting the particles on the moving support means with surface-plastic portions of adjacent particles in fused contact and with interstices remaining between the particles, such that the deposited particles constitute a substantially uniform-thickness electrically conductive strip which is porous in character by reason of the presence of the interstices.

When the metal particles are deposited on the support means by such a free-falling or gravity movement they are collected by a gentle action which is in contrast to the velocity impingement action produced by spraying of such particles and has the advantage of a better placement control for the particles and a better preservation of the exterior shape of the particles. The better placement and shape control result from the fact that any tendency for the free-falling or gently dropped particles to bounce is largely eliminated as well as any tendency to flatten out or spread into a film due to velocity impact. The gentle dropping, free-falling or gravity action also eliminates the wasteful overspray movement of particles beyond the edges of the support means, which usually occurs when the particles are projected by a spraying action or the like.

Likewise when the metal particles are heated to the surface-plastic or surface-molten condition during a free-falling, or gravity movement, they are better able to retain or acquire a desired external shape than if they were being projected or thrown with a velocity movement or in a velocity stream. The better shape control results from the fact that the flowable exterior portions of the particles obey natural laws of physics and try to assume a convex or spherical external shape during the free-falling movement as is customary for free-falling drops of liquid or molten metal.

The achievement by this method of a more satisfactory external shape for the heated particles, coupled with the gentle dropping, free-falling or gravity movement thereof onto the support means, therefore results in a more satisfactory placement or disposition of the deposited particles by which they assume positions in interfitting array and with fused surface contact between adjacent particles, so that the strip or sheet material being produced has more uniform characteristics of strip thickness, porosity and electrical conductivity than have been obtainable heretofore.

The method contemplates the use therein of metal particles having a convex exterior shape and, for the attainment of the advantages mentioned above to an even higher degree, the use of metal particles of a substantially spherical shape. The invention further contemplates that the metal particles can advantageously be of a substantially uniform size, preferably not exceeding twenty microns in diameter.

Another object is to provide such a novel method for producing electrically conductive porous sheet or strip material in which a base strip is moved in overlying relation to the support means to receive the surface-plastic metal particles thereon, by the gentle dropping, free-falling or gravity action and in which the electrically conductive porous layer formed by the deposited surface-plastic metal particles is adherently connected to the base strip.

In the way of end-result advantages obtainable from the novel method steps explained above it can be pointed out that, by reason of the more uniform thickness and porosity characteristics of the strip material being produced, the material is more readily impregnated or traversed by electrolyte, more readily permits the escape of evolved gas, has a lower internal electrical resistance because of the cooler state of the material due to a freer circulation of electrolyte, and also because the lower heat of fabrication used in the deposition process results in the presence of only a relatively small amount of oxide and electrolytic devices or the like using this material can be made more accurate and precise as to their physical size, capacitance value, temperature co-efficients and other performance characteristics.

This application is a continuation-in-part of application Serial No. 551,913, filed December 18, 1955, and now abandoned.

Other objects and advantages of this invention will be apparent in the following detailed description and in the accompanying drawing forming a part of this specification and in which:

Fig. 1 is a side elevation illustrating the method of this invention;

Fig. 2 is a transverse section taken through the electrically conductive strip material being produced, the view being taken substantially as indicated by section line 2—2 of Fig. 1 but on a larger scale, Figs. 3 to 8 inclusive are diagrammatic views illustrating positional arrangements assumed by the metal particles; and Fig. 9 is a transverse section similar to that of Fig. 2, but showing the porous metal strip without the base strip.

Production of electrically conductive porous sheet or strip material 10 in accordance with the present invention is illustrated in Fig. 1 which shows one form of apparatus 11 for this purpose. Before proceeding with a detailed description of the method and apparatus, however, the electrically conductive material itself will be described.

The electrically conductive material 10, as herein produced is in sheet or strip form which, for convenience, will hereinafter be referred to merely as a strip and as shown in Figs. 1 and 2, comprises a base strip 12 and a metallic strip or layer 13 adherently connected to the surface 14 of the base strip and preferably extending over the full area thereof. The base strip 12 can be electrically conductive in character such as by being made of metal foil, or can be non-conductive in character by being made of paper or other fibrous material. The base stirp can also be a stranded porous web of a woven or unwoven character such as gauze or a strip of predominantly-parallel filaments.

The metallic strip 13 is formed by a deposit of metal particles 15 of a convex exterior shape. In the drawing the particles 15 are shown as being substantially spherical. The particles 15 may also be of a substantially uniform weight and size, preferably not exceeding twenty microns in diameter.

The particles 15 are gently deposited by a free-falling movement and are collected on a support means which may consist of or include the base strip 12. The collected particles have surface portions of adjacent particles in contact with each other with interstices 16 remaining between such adjacent particles to give the metallic strip 13 its desired porous characteristics. At their points of surface engagement the adjacent particles 15 are permanently fused together in a distribution of the particles over the surface 14, such that they constitute the metallic strip 13 which will have a substantially uniform thickness at all points longitudinally and transversely of the strip and will be both electrically conductive and porous in character.

Fig. 9 shows an electrically conductive porous metallic strip 18 which is substantially the same in purpose and character as the metallic strip 13 but is shown without any base strip. The strip 18 can be initially produced without any base strip thereon, as will be explained hereinafter, or can be obtained from the above-described composite strip 10 by suitably removing the base strip 12 from the latter. The removal of the base strip 12 from the composite strip 10 can be accomplished as by disintegration or burning, or otherwise removing the base strip.

The apparatus 11 comprises, in general, a supply means 20 for supplying a quantity of preformed discrete metal particles 15 of a convex exterior shape, a support means 21 for receiving the particles thereon, a heating means 22 and a cooling means 23. The support means 21 is here shown as comprising conveyors 21ᵃ and 21ᵇ of the belt type. When the base strip 12 is used in conjunction with the apparatus 11, it forms a part of the support means.

The conveyor 21ᵃ comprises an endless belt 24 extending around a pair of drums 25 and 26. One of the drums of the conveyor 21ᵃ, such as the drum 26 is suitably driven for propelling the conveyor belt 24. The portion of the belt 24 which is adjacent the drum 25 forms the receiving end of the conveyor 21ᵃ and the portion of the belt adjacent the drum 26 forms the delivery end of this conveyor.

The conveyor 21ᵇ comprises an endless belt 28 extending around a pair of drums 29 and 30. One of the drums of the conveyor 21ᵇ, such as the drum 30, is suitably driven for propelling the belt 28. The portion of the belt 28 which is adjacent the drum 29 represents the receiving end of the conveyor 21ᵇ and is disposed beneath the delivery end of the conveyor 21ᵃ.

The supply means 20 is here shown as being a hopper 31 containing a quantity of the metal particles 15 and has a discharge slot 32 at its lower end extending transversely of the conveyor belt 24 for feeding a quantity of the particles to the latter. A doctor blade 33 located adjacent the hopper 31 is effective on the deposited particles for spreading and distributing the same so as to constitute a substantially uniform-thickness deposit 35 of loose particles on the conveyor belt 24. The substantially uniformly distributed particles 15 of the loose layer 35 provide substantially the correct amount or quantity of these particles for forming the above-described uniform-thickness metallic strip 13 of the completed strip material 10.

The heating means 22 of the apparatus 11 is here shown as comprising an upright hollow structure 36, associated with the discharge end of the first conveyor 21ᵃ and defining a heating zone or passage 37 adapted to be traversed by the metal particles 15 with a free-falling movement during the transfer thereof from the first conveyor to the second conveyor 21ᵇ. The heating means 22 also comprises a suitable source of heat of an appropriate temperature and quantity, such as the gas burners 38 and 39 to which a combustible gas, such as acetylene gas, is supplied.

The heat supplied by burners 38 and 39 may be of the temperature of 1350° to 4000° F. and renders the heating zone 37 effective for a sufficient length of travel of the particles therethrough to heat the particles to a surface-plastic or surface-molten condition, that is to say, to a condition in which the particles are exteriorly molten but interiorly solid. Since the particles are in a free-falling condition while being thus heated, they will retain or acquire the convex shape referred to above as well as their individual character.

Upon traversing the heating zone 37, the surface-plastic particles 15 are deposited by gravity, and in the gentle manner mentioned above, onto the conveyor 21ᵇ on which they form the above-described substantially uniform-thickness strip 13 wherein the particles are permanently joined together at fused points of contact of adjacent particles with interstices remaining between the particles for the desired porosity of the strip. The fusing of the particles together is completed by a cooling of the strip 13 by the cooling means 23.

The cooling means 23 comprises a pipe coil 40 through which a suitable fluid cooling medium is circulated and which is disposed beneath the upper reach of the conveyor 21ᵇ so as to be located directly under the heating means 22. As soon as the surface-plastic particles are deposited on the conveyor 21ᵇ, they are cooled to their fused strip-forming condition before any substantial distortion of the particles from their convex shape takes place. Additional cooling of the strip 13 may be effected, as the strip material 10 advances with the conveyor belt 28, by fluid streams of coolant directed thereagainst.

When the base strip 14 forms a part of the support means as shown in Fig. 1, the surface-plastic particles 15 are deposited on the base strip which extends in overlying relation to, and moves with, the upper reach of the conveyor 21ᵇ. The base strip 14 is withdrawn from a supply roll 42 of this material.

The composite strip 10 produced in the manner above described is separated from the conveyor 21ᵇ by leading the strip away from the conveyor belt 28 or by stripping the product strip therefrom. This can be accomplished by directing the strip 10 between a pair of co-operating guide rollers 43 and 44 to a take-up roll 45 on which the completed strip is wound and temporarily stored. A pressure roll 46 holds the base strip 14 against the conveyor belt 28 so as to be propelled by the latter.

When the electrically conductive strip is produced in the form of the above described strip 18 of Fig. 9, which is without any base strip, the same method procedure is followed as has been described above in connection with the apparatus in Fig. 1, except that the base strip 14 is omitted and the surface-plastic particles 15 are deposited by gentle dropping directly onto the upper reach of the conveyor belt 28. The resulting electrically conductive and porous metal strip 18 is separated from the conveyor belt 28 by stripping the same therefrom and is directed to the take-up roll 45 by the guide rollers 43 and 44.

When an electrically conductive porous metal strip, such as the above described strips 10 and 18, is produced by the present method from preformed metal particles of a convex shape and preferably not exceeding twenty microns in diameter, the particles will form the substantially uniform-thickness strip 13 and will assume an arrangement therein in which the interstices 16 remaining between the adjacent particles will provide the desired uniform high degree of porosity of the strip. The attainment of this uniform high degree of porosity can be further explained by reference to the diagrammatic views of Figs. 3 to 8 inclusive wherein the particles 15 are shown as being substantially spheroidal in shape.

Fig. 3 represents a large-scale plan view of a portion of the metal strip 13, such as an area 1" x 1" square by .015" thick and containing closely packed spheroidal metal particles 15 of approximately eight microns in diameter. In their loosest possible arrangement, the particles would be in a face-centered cubic array such as is represented in Fig. 3 and the number of particles contained in the above-mentioned unit area of .015" thickness could be determined from the following calculation, having in mind that each particle would occupy a cube eight microns on a side.

$$1'' = 2.54 \text{ centimeters} = 25,400 \text{ microns}$$
$$.015'' = 0.0381 \text{ centimeter} = 381 \text{ microns}$$

The total number of particles would be $$\left(\frac{25,400}{8}\right)\left(\frac{25,400}{8}\right)\left(\frac{381}{8}\right) = 480,000,000 \text{ particles}$$

The particles 15 have a natural tendency to assume a pyramid array, as shown in Fig. 4, because of their convex shape. This results in the particles being disposed in substantially parallel rows in each layer as is indicated in Fig. 5, with portions of the particles interfitting between pairs of adjacent particles such that larger number of the particles could be packed in the above-mentioned unit volume space.

When the particles are in the Fig. 5 arrangement, the distance between parallel rows is relatively shorter because of interfitting relation of the particles and would decrease by an amount equal to $$\text{cosine } 60° = \frac{1}{2}\sqrt{3}$$

and hence the number of particles would increase by a factor of $2\sqrt{3}$ in such a horizontal close-packed layer.

Fig. 6 illustrates the vertical close-packing characteristic of the particles 15 in which the particles of one horizontal layer nest into the spaces between the particles of the horizontal layer below it.

Fig. 7 is a computation diagram in which the point 50 is the common center of the three particles 15 shown in this view. The triangle 51 formed by joining the centers of the particles is an equilateral triangle whose corner angles are 60° angles.

Fig. 8 illustrates how the particle 52 resting in a nest of three lower particles 15 assumes a condition of repose for which the value of an angle of repose, called $\theta$, can be computed.

The distance in Fig. 7 from the center of one of the particles 15 to the common center 50 is represented by the line 52 and can be computed from the following expression in which $r$ is the radius of the particles:

$$r \text{ secant } 30° = \text{center distance } (52) = \frac{2r}{\sqrt{3}}$$

The vertical distance, measured from the common center 50, which is necessary to have a separation of $2r$ between the centers of the particles is represented by the line 53 of Fig. 7 and can be computed as follows:

$$\frac{2r}{\sqrt{3} \times \text{secant } \phi} = 2r$$

$$\text{secant } \phi = 3$$

from which it follows that $$\text{cosine } \phi = \frac{1}{3}$$

$$\phi = 54.8°$$

The distance between the close-packed layers of Fig. 6 will be sine $54.8° \times 8$ microns
sine $54.8° = 0.816$ Hence, the number of particles would increase by a factor of $$\frac{1}{0.816}$$

due to the vertical close packing of the particles. The total increase in the number of particles in the unit space due to both horizontal and vertical close packing would be:

$$\frac{1}{0.816} \times \frac{2}{\sqrt{3}} = \sqrt{2} = 141\% \times \text{the number of loose-packed particles contained in the unit space}$$

or $141\% \times 480,000,000 = 676,800,000$ particles.

The surface area of each particle is $$4\pi 4^2 = 64\pi \times 10^{-8} \text{ centimeters}$$
$$= 2.01 \times 10^{-6} \text{ centimeters}$$

The total surface area of all of the particles contained in the unit space is therefore 1,360 square centimeters = 214 square inches.

If 25% of the surface area is assumed to be lost by reason of the area of the fusion points, then the net area of all of the particles of the unit space would be: $.25 \times 1,360 = 1,020$ square centimeters —158 square inches.

From the accompanying drawing and the foregoing detailed description, it will now be readily understood that this invention provides a novel method for producing electrically conductive porous strip material by depositing exteriorly-molten and interiorly-solid metal particles on a moving support means by a free-falling movement and gentle dropping, such that the particles constitute a substantially uniform-thickness metal strip in which surface portions of adjacent particles are permanently fused together while interstices remain between the particles to give the strip a desired very large exposed aggregate surface area and a desired high degree of porosity and uniform porosity. It will also be seen that because of the large exposed surface area and high uniform porosity, this strip material will be well suited for use in electrical condensers and will produce condensers having a high capacity in relation to their size, as well as a low operating temperature and a low internal electrical resistance.

It will now also be recognized that by heating the metal particles to the surface-molten condition during their free-falling movement and by collecting the particles on the support means by the gentle dropping action, a better control is achieved for the placement and exterior shape of the particles because of the elimination of bounce, overspray and flattening which usually occurs when particles are sprayed or thrown onto the support means. This better control for the placement and shape of the particles results in the more uniform and satisfactory characteristics explained above for the strip material being produced and for the condensers or other articles made from that strip material. In this connection it will additionally be seen that when electrically conductive porous strip material, as produced by the present invention, is used in an electrical device such as a condenser, the device can be more accurately and precisely manufactured with respect to its various desired characteristics such as its physical size, capacitance value, temperature coefficients, electrical resistance and other performance characteristics.

Another feature of the invention resides in that an oxide or carbide surface can be formed on the gravity-deposited convex particles by known means which assists in preventing corrosion of the particles, and such a formed surface also may be used to increase porosity and permeability when porosity is desired with great internal area, and may further be used as a cement or for other applications requiring corrosion resistance or heat resistance or other features of filmed metals.

Although the method of the present invention has been illustrated and described herein to a somewhat detailed extent, it will be understood, of course, that the invention is not to be regarded as being limited correspondingly in scope but includes all changes and modifications coming within the terms of the claims hereof.

What is claimed is:

1. The method of producing electrically conductive porous strip material comprising the steps of providing a supply of discrete exteriorly convex metal particles, advancing a support surface, dropping said particles as free-falling particles from a delivery point spaced above said surface, heating the particles to at least an exteriorly molten condition during their free-falling movement so that the molten exteriors of the particles remain convex in shape and are of a fusible character when the particles reach said surface, and collecting the particles on said surface as such conductive strip material and so that the particles assume a condition of repose with convex surface portions of adjacently grouped particles in interfitting relation and fused together at their points of contact and with interstices remaining between the adjacent particles to provide the porous character of the strip material.

2. The method of producing electrically conductive porous strip material as defined in claim 1 and which includes the steps of cooling the support surface and separating the strip material from said support surface.

3. The method of producing electrically conductive porous strip material as defined in claim 1 wherein said support surface is a porous fibrous base strip, and wherein said particles are collected on said base strip in an adherent relation thereto.

4. The method of producing electrically conductive porous strip material as defined in claim 1 wherein the convex metal particles used are substantially spheroidal.

5. The method of producing electrically conductive porous strip material comprising the steps of providing a supply of discrete metal particles, advancing a support surface, supplying heat to a heating zone, passing the particles through said zone with a free-falling movement of a height to gently drop the particles onto said surface, heating the particles to at least a surface-plastic and tacky condition during their free-falling movement and to an extent that the surface-plastic and tacky condition remains when the particles reach said surface, and collecting the particles on said surface as such conductive strip material and so that the particles assume a condition of repose with surface portions of adjacent particles joined together at their points of contact and with interstices remaining between the adjacent particles to provide the porous character of the strip material.

6. The method of producing electrically conductive porous strip material comprising the steps of providing a supply of discrete exteriorly convex metal particles, advancing a support surface, supplying heat to a heating zone, passing the particles through said zone with a free-falling movement of a height to gently drop the particles onto said surface, heating the particles to at least an exteriorly molten condition during their free-falling movement so that the molten exteriors of the particles remain convex in shape and are of a fusible character when the particles reach said surface, and collecting the particles on said surface as such conductive strip material and so that the particles assume a condition of repose with convex surface portions of adjacently grouped particles in interfitting relation and fused together at their points of contact and with interstices remaining between the adjacent particles to provide the porous character of the strip material.

7. The method of producing electrically conductive strip material comprising the steps of providing a supply of discrete exteriorly convex metal particles, advancing a metallic base strip, dropping said particles as free-falling particles from a delivery point spaced above said base strip, heating the particles to at least an exteriorly molten condition during their free-falling movement so that the molten exteriors of the particles remain convex in shape and are of a fusible character when the particles reach said base strip, and collecting the particles on said base strip as a porous deposit strip and so that the particles assume a condition of repose with convex surface portions of adjacently grouped particles in interfitting relation and fused together at their points of contact and with interstices remaining between the adjacent particles to provide the porous character of the deposit strip.

8. The method of producing electrically conductive strip material as defined in claim 7 wherein said base strip comprises metal foil, and wherein said particles are collected on said base strip in an adherent relation thereto.

References Cited in the file of this patent

UNITED STATES PATENTS

| | | |
|---|---|---|
| 1,128,059 | Shoop | Feb. 9, 1915 |
| 2,252,697 | Brassert | Aug. 19, 1941 |
| 2,290,734 | Brassert | July 21, 1942 |
| 2,372,607 | Schwarzkopf | Mar. 27, 1945 |
| 2,547,371 | Brennan | Apr. 3, 1951 |